United States Patent
Kashima et al.

(10) Patent No.: US 10,662,339 B2
(45) Date of Patent: May 26, 2020

(54) SILICA SOL CONTAINING PHENYLPHOSPHONIC ACID AND APPLICATIONS THEREOF

(71) Applicant: NISSAN CHEMICAL INDUSTRIES, LTD., Tokyo (JP)

(72) Inventors: Yoshiyuki Kashima, Sodegaura (JP); Noriyuki Takakuma, Sodegaura (JP); Daisuke Shimizu, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 108 days.

(21) Appl. No.: 16/082,000

(22) PCT Filed: Feb. 24, 2017

(86) PCT No.: PCT/JP2017/007165
§ 371 (c)(1),
(2) Date: Sep. 4, 2018

(87) PCT Pub. No.: WO2017/150383
PCT Pub. Date: Sep. 8, 2017

(65) Prior Publication Data
US 2019/0153240 A1    May 23, 2019

(30) Foreign Application Priority Data

Mar. 3, 2016  (JP) .................. 2016-041154

(51) Int. Cl.
C09D 5/08 (2006.01)
C09D 1/00 (2006.01)
C09D 7/40 (2018.01)
C23C 22/00 (2006.01)

(52) U.S. Cl.
CPC .............. C09D 5/086 (2013.01); C09D 1/00 (2013.01); C09D 5/08 (2013.01); C09D 5/084 (2013.01); C09D 7/40 (2018.01); C09D 7/67 (2018.01); C09D 7/68 (2018.01); C23C 22/00 (2013.01)

(58) Field of Classification Search
CPC . C09D 1/00; C09D 5/08; C09D 5/084; C09D 5/086; C09D 7/40; C09D 7/67; C09D 7/68; C23C 22/00
See application file for complete search history.

(56) References Cited

U.S. PATENT DOCUMENTS 6,361,872 B1 * 3/2002 Hosono ............... C09D 167/00
428/467
2010/0261825 A1   10/2010 Senkfor et al.

FOREIGN PATENT DOCUMENTS

| JP | 2002-47576 A | | 2/2002 |
|---|---|---|---|
| JP | 2002107956 A | * | 4/2002 |
| JP | 2002-146405 A | | 5/2002 |
| JP | 2004-099929 A | | 4/2004 |
| JP | 2007-217758 A | | 8/2007 |
| JP | 2008-266743 A | | 11/2008 |
| JP | 2008-303411 A | | 12/2008 |
| JP | 2009-155707 A | | 7/2009 |
| JP | 2010-013692 A | | 1/2010 |
| JP | 2013-249486 A | | 12/2013 |
| WO | 2007/007417 A1 | | 1/2007 |
| WO | 2007/136115 A1 | | 11/2007 |
| WO | 2009/123156 A1 | | 10/2009 |
| WO | 2012/011576 A1 | | 1/2012 |

OTHER PUBLICATIONS

Sep. 6, 2019 European Search Report issued in European Patent Application No. 17759849.7.
Apr. 9, 2019 European Search Report issued in European Patent Application No. 17759849.7.
Apr. 11, 2017 International Search Report issued in International Patent Application No. PCT/JP2017/007165.
Apr. 11, 2017 Written Opinion issued in International Patent Application No. PCT/JP2017/007165.
Jan. 6, 2020 Office Action issued in Chinese Patent Application No. 201780013793.2.

* cited by examiner

*Primary Examiner* — Anthony J Green
(74) *Attorney, Agent, or Firm* — Oliff PLC

(57) ABSTRACT

A coating-forming composition for an electrical steel sheet that maintains excellent insulating properties, corrosion resistance, adhesion, and the like required in a coating for an electrical steel sheet, and exhibits excellent viscosity stability, with an increase in viscosity over time being kept gradual. A coating-forming composition for an electrical steel sheet comprises colloidal silica, a phosphate, phenylphosphonic acid or a salt thereof, and an aqueous medium.

12 Claims, No Drawings

SILICA SOL CONTAINING PHENYLPHOSPHONIC ACID AND APPLICATIONS THEREOF

TECHNICAL FIELD

The present invention relates to a coating-forming composition for an electrical steel sheet, and specifically relates to a coating-forming composition for an electrical steel sheet that maintains excellent insulating properties, corrosion resistance, adhesion, and the like required in a coating for an electrical steel sheet, and exhibits excellent viscosity stability, with an increase in viscosity over time being kept gradual.

BACKGROUND ART

Typically, the surface of an electrical steel sheet has an insulating coating for reducing eddy current loss, and the insulating coating is required to have coating characteristics such as corrosion resistance and adhesion, in addition to the insulating properties.

Those that are known as such insulating coatings include an insulating coating containing a phosphate, an organic resin, and the like as main components, an insulating coating containing silica, an organic resin, and the like as main components, an insulating coating containing silica, a phosphate, and the like as main components, and an insulating coating containing alumina, boric acid, and the like as main components. An insulating coating is typically formed by applying a solution containing these components to a surface-treated silicon steel sheet, and baking it.

However, when this solution is allowed to stand, the viscosity may increase due to agglomeration or the like, which may cause problems during coating, or have an adverse effect on the characteristics of the insulating coating.

Patent Document 1 discloses using a mixture of an alumina sol, boric acid, and nitric acid as an insulating coating for an electrical steel sheet. This document describes that the viscosity stability of the coating solution can be ensured by using an alumina sol having specific properties, and setting the molar ratio between the alumina sol and boric acid within a specific range.

Patent Documents 2 to 7 disclose insulating coatings for electrical steel sheets each containing silica, a phosphate, and the like as main components. These documents describe that excellent performance can be imparted to the insulating coatings to be formed, by adding specific metal compounds, limiting the proportions of the components, or using specific phosphates, for example.

However, in an insulating coating for an electrical steel sheet containing silica, a phosphate, and the like as main components, no proposal has been made to improve the viscosity stability of the coating solution for forming the insulting coating.

PRIOR ART DOCUMENTS

Patent Documents

Patent Document 1: Japanese Patent Application Publication No. 2004-099929 (JP 2004-099929 A)
Patent Document 2: Japanese Patent Application Publication No. 2010-013692 (JP 2010-013692 A)
Patent Document 3: Japanese Patent Application Publication No. 2008-266743 (JP 2008-266743 A)
Patent Document 4: Japanese Patent Application Publication No. 2007-217758 (JP 2007-217758 A)
Patent Document 5: WO 2009/123156
Patent Document 6: WO 2007/136115
Patent Document 7: WO 2007/007417

SUMMARY OF THE INVENTION

Problem to be Solved by the Invention

It is an object of the present invention to provide a coating-forming composition for an electrical steel sheet that maintains excellent insulating properties, corrosion resistance, adhesion, and the like required in a coating for an electrical steel sheet, and exhibits excellent viscosity stability, with an increase in viscosity over time being kept gradual.

Means for Solving the Problem

As a result of diligent study to achieve the aforementioned object, the inventors of the present invention found that when phenylphosphonic acid or a salt thereof is added to a coating-forming composition for an electrical steel sheet containing colloidal silica and a phosphate as main components, a coating for an electrical steel sheet formed using the composition maintains excellent insulating properties, corrosion resistance, adhesion, and the like required in a coating for an electrical steel sheet, and exhibits excellent viscosity stability, with an increase in viscosity over time in the composition being kept gradual, thus completing the present invention.

In summary, a first aspect of the present invention relates to a coating-forming composition for an electrical steel sheet comprising colloidal silica, a phosphate, phenylphosphonic acid or a salt thereof, and an aqueous medium.

A second aspect of the present invention relates to the composition according to claim 1, wherein the colloidal silica is colloidal silica having an average particle diameter of 1 to 500 nm.

A third aspect of the present invention relates to the composition according to claim 1, wherein the phosphate is aluminium dihydrogen phosphate, monomagnesium phosphate (primary magnesium phosphate), or monocalcium phosphate (primary calcium phosphate).

A fourth aspect of the present invention relates to the composition according to any one of claims 1 to 3, wherein an amount of the phosphate is 50 to 700 parts by mass, and an amount of the phenylphosphonic acid or a salt thereof is 0.05 to 10 parts by mass, per 100 parts by mass of the colloidal silica.

A fifth aspect of the present invention relates to the composition according to any one of claims 1 to 4, further comprising a colloidal metal oxide.

A sixth aspect of the present invention relates to the composition according to claim 5, wherein the colloidal metal oxide is colloidal zirconia, colloidal titania, or colloidal ceria having an average particle diameter of 1 to 500 nm.

A seventh aspect of the present invention relates to a method for producing the coating-forming composition for an electrical steel sheet according to claim 2, comprising the step of mixing a silica sol comprising colloidal silica having an average particle diameter of 1 to 500 nm, a phosphate, and phenylphosphonic acid or a salt thereof.

An eighth aspect of the present invention relates to a method for producing the coating-forming composition for an electrical steel sheet according to claim 6, comprising the step of mixing a silica sol comprising colloidal silica having an average particle diameter of 1 to 500 nm, a metal oxide sol comprising a colloidal metal oxide having an average particle diameter of 1 to 500 nm, a phosphate, and phenylphosphonic acid or a salt thereof.

A ninth aspect of the present invention relates to a method for producing the coating-forming composition for an electrical steel sheet according to claim 2, comprising the step of mixing a silica sol comprising phenylphosphonic acid or a salt thereof and colloidal silica having an average particle diameter of 1 to 500 nm, and a phosphate.

A tenth aspect of the present invention relates to a method for producing the coating-forming composition for an electrical steel sheet according to claim 6, comprising the step of mixing a silica sol comprising phenylphosphonic acid or a salt thereof and colloidal silica having an average particle diameter of 1 to 500 nm, a metal oxide sol comprising a colloidal metal oxide having an average particle diameter of 1 to 500 nm, and a phosphate.

An eleventh aspect of the present invention relates to a sol in which phenylphosphonic acid or a salt thereof and colloidal silica having an average particle diameter of 1 to 500 nm are dispersed in an aqueous medium, wherein the phenylphosphonic acid or a salt thereof is contained in an amount of 0.05 to 10% by mass based on a total mass of $SiO_2$ contained in the sol.

A twelfth aspect of the present invention relates to the sol according to claim 11 for use as a coating material.

Effects of the Invention

In accordance with the present invention, there is provided a coating-forming composition for an electrical steel sheet that maintains excellent insulating properties, corrosion resistance, adhesion, and the like required in a coating for an electrical steel sheet, and exhibits excellent viscosity stability, with an increase in viscosity over time being kept gradual.

MODES FOR CARRYING OUT THE INVENTION

The present invention will be further described in more detail.

A coating-forming composition for an electrical steel sheet of the present invention is characterized by comprising colloidal silica, a phosphate, phenylphosphonic acid or a salt thereof, and an aqueous medium.

As colloidal silica that can be used in the coating-forming composition for an electrical steel sheet of the present invention, a sol (silica sol) in which colloidal silica having an average particle diameter of 1 to 500 nm is dispersed in an aqueous medium can be used.

As the silica sol, a silica sol containing colloidal silica having a particle size having sharp distribution, a silica sol containing colloidal silica having a particle size having broad distribution, or a mixture thereof may be used. Any of these silica sols can be used in the present invention.

The average particle diameter of the colloidal silica in the silica sol is from 1 to 500 nm, 5 to 500 nm, or 5 to 200 nm.

While examples of the average particle diameter as used herein include an average particle diameter in accordance with the BET method and an average particle diameter in accordance with the DLS (Dynamic Light Scattering) method, the average particle diameter in accordance with the BET method can be used as the average particle diameter of the present invention.

As the silica sol, a silica sol having a silica content (as the mass of $SiO_2$ based on the total mass of the silica sol) of 0.1 to 50% by mass or 10 to 50% by mass can be used.

Examples of phosphates that can be used in the coating-forming composition for an electrical steel sheet of the present invention include phosphates containing one or more metals from Al, Mg, Ni, Mn, Co, Mo, Zr, and Sr, for example.

Specific examples of preferred phosphates include aluminium dihydrogen phosphate, monomagnesium phosphate, or monocalcium phosphate.

The phosphate is preferably used in an amount of 50 to 700 parts by mass per 100 parts by mass of the colloidal silica ($SiO_2$ contained in the composition).

Examples of phenylphosphonic acid or a salt thereof that can be used in the coating-forming composition for an electrical steel sheet of the present invention include phenylphosphonic acid, lithium phenylphosphonate, sodium phenylphosphonate, potassium phenylphosphonate, and ammonium phenylphosphonate. As the phenylphosphonic acid or a salt thereof, one of the above can be used, or a mixture obtained by mixing two or more of the above at any ratio can be used.

The phenylphosphonic acid or a salt thereof can be used in an amount of 0.05 to 10% by mass, 0.05 to 5% by mass, 0.05 to 3% by mass, 0.05 to 1.00% by mass, or 0.1 to 1.0% by mass, based on the total mass of $SiO_2$ contained in the composition.

The coating-forming composition for an electrical steel sheet of the present invention can further contain a colloidal metal oxide.

Examples of the colloidal metal oxide include colloidal zirconia, colloidal titania, or colloidal ceria having an average particle diameter of 1 to 500 nm. The colloidal metal oxide can be used as a zirconia sol containing the colloidal zirconia, a titania sol containing the colloidal titania, or a ceria sol containing the colloidal ceria.

The average particle diameter of the colloidal metal oxide is from 1 to 500 nm, 5 to 500 nm, or 5 to 200 nm.

The content of the metal oxide ($ZrO_2$, $TiO_2$, or $CeO_2$) in the metal oxide sol (zirconia sol, titania sol, or ceria sol) is 0.1 to 50% by mass or 10 to 40% by mass.

These metal oxide sols can be used in an acidic or alkaline state, and have a pH of 1 to 13.

When a colloidal metal oxide is used, the amount of the colloidal metal oxide is 10 to 100 parts by mass per 100 parts by mass of the colloidal silica.

The content of solids in the coating-forming composition for an electrical steel sheet is 15 to 45% by mass, preferably 25 to 40% by mass, based on the total mass of the coating-forming composition for an electrical steel sheet.

As used herein, "solids" refers to a portion that remains after removing the solvent (water as the solvent) from the coating-forming composition for an electrical steel sheet.

The coating-forming composition for an electrical steel sheet can contain 50 to 700 parts by mass of the phosphate and 0.05 to 10 parts by mass of the phenylphosphonic acid or a salt thereof, per 100 parts by mass of the colloidal silica ($SiO_2$ contained in the composition), and preferably 70 to 500 parts by mass of the phosphate and 0.2 to 7 parts by mass of the phenylphosphonic acid or a salt thereof, per 100 parts by mass of the colloidal silica.

The coating-forming composition for an electrical steel sheet can contain, in addition to the colloidal silica, the phosphate, the phenylphosphonic acid or a salt thereof, and the aqueous medium, 10 to 100 parts by mass of the colloidal metal oxide, a surfactant, and an organic resin emulsion (such as an acrylic-based resin emulsion, an epoxy-based resin emulsion, or a polyester-based resin emulsion), as required, per 100 parts by mass of the colloidal silica.

A method for producing the coating-forming composition for an electrical steel sheet of the present invention will be hereinafter described.

The coating-forming composition for an electrical steel sheet of the present invention can be produced by mixing a silica sol comprising colloidal silica having an average particle diameter of 1 to 500 nm, a phosphate, and phenylphosphonic acid or a salt thereof.

The coating-forming composition for an electrical steel sheet comprising a colloidal metal oxide can be produced by mixing a silica sol comprising colloidal silica having an average particle diameter of 1 to 500 nm, a metal oxide sol comprising a colloidal metal oxide having an average particle diameter of 1 to 500 nm, a phosphate, and phenylphosphonic acid or a salt thereof.

The coating-forming composition for an electrical steel sheet of the present invention can also be produced by mixing a silica sol comprising phenylphosphonic acid or a salt thereof and colloidal silica having an average particle diameter of 1 to 500 nm, and a phosphate.

The coating-forming composition for an electrical steel sheet comprising a colloidal metal oxide can also be produced by mixing a silica sol comprising phenylphosphonic acid or a salt thereof and colloidal silica having an average particle diameter of 1 to 500 nm, a metal oxide sol comprising a colloidal metal oxide having an average particle diameter of 1 to 500 nm, and a phosphate.

The coating-forming composition for an electrical steel sheet of the present invention is applied to a surface-treated silicon steel sheet and baked to form a coating for an electrical steel sheet.

The baking temperature for the coating formed by applying the coating-forming composition for an electrical steel sheet to the surface-treated silicon steel sheet is 150 to 350° C. for a non-grain-oriented electrical steel sheet, and 800 to 1000° C. for a grain-oriented electrical steel sheet.

When a surface-treated silicon steel sheet is coated with the coating-forming composition for an electrical steel sheet and baked, an electrical steel sheet having high insulating properties and high tension can be obtained. The amount of the coating of the coating-forming composition for an electrical steel sheet on the surface-treated silicon steel sheet is preferably such that the amount of the coating-forming composition for an electrical steel sheet adhering to the surface-treated silicon steel sheet is 2 to 7 $g/m^2$. If the amount of the composition is less than 2 $g/m^2$, high tension is unlikely to be obtained, and sufficient insulating performance cannot be maintained. If the amount of the composition is more than 7 $g/m^2$, blistering will occur on the coating surface, resulting in a poor appearance.

The present invention also relates to a sol in which phenylphosphonic acid or a salt thereof and colloidal silica having an average particle diameter of 1 to 500 nm are dispersed in an aqueous medium, wherein the phenylphosphonic acid or a salt thereof is contained in an amount of 0.05 to 10% by mass based on a total mass of $SiO_2$ contained in the sol.

The silica sol containing phenylphosphonic acid or a salt thereof can be used as an acidic or alkaline silica sol, which has a pH of 1 to 13.

The present invention also relates to the sol for use as a coating material.

EXAMPLES

The present invention will be hereinafter described more specifically with examples, although the present invention is not limited to these examples.

Example 1

150 g of warm water at 40° C. was placed in a polyethylene container, and 50 g of powdery phenylphosphonic acid (from Nissan Chemical Industries, Ltd.) was gradually added while stirring with a stirrer, and completely dissolved. A 25% by mass solution having a pH of 0.7 was thus prepared.

Separately, 500 g of a silica sol (from Nissan Chemical Industries, Ltd.; containing 30.5% by mass of $SiO_2$; pH 10.2; particle diameter: 22 nm) was placed in a polyethylene container, and 16.2 g of the 25% by mass aqueous solution of phenylphosphonic acid was gradually added with stirring. After the completion of the addition, stirring was continued for 30 minutes. The resulting phenylphosphonic acid-containing silica sol contained 29.5% by mass of $SiO_2$ and 0.78% by mass of phenylphosphonic acid, i.e., contained 2.65% by mass of phenylphosphonic acid based on the total mass of $SiO_2$. The silica sol had a pH of 2.9 and an electrical conductivity of 3.6 ms/cm.

This silica sol was stable without showing an increase in viscosity for 30 days at a storage temperature of 50° C.

139.8 g of a commercially available aqueous solution of aluminium dihydrogen phosphate (from Yoneyama Chemical Industry Co., Ltd.; trade name: aluminium dihydrogen phosphate (50% solution), $Al(H_2PO_4)_3$) was placed in a polyethylene container, and 160.8 g of the phenylphosphonic acid-containing silica sol was gradually added with stirring. A coating-forming composition for an electrical steel sheet was thus obtained. After the completion of the addition, stirring was continued for 30 minutes. The mass ratio of the aqueous solution of aluminium dihydrogen phosphate to the silica sol was 46.6/53.4. When this was converted to a mass ratio of aluminium dihydrogen phosphate to silica, the mass ratio was 23.3/15.8.

The resulting coating-forming composition for an electrical steel sheet had a pH of 1.5 and an electrical conductivity of 11.5 ms/cm.

Phenylphosphonic acid has the following structure:

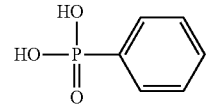

A 100 g portion of this mixture was transferred into each of three containers, which were placed in a thermostat at 22° C., and allowed to stand. After 1, 2, or 3 days, each of the containers was removed from the thermostat, and the mixture was heated to 25° C. With a Brookfield viscometer, the viscosity after 60 seconds from the start of rotation was measured.

(Viscosity Measurement)

For viscosity measurement, a viscosity (1) was measured, and then a viscosity (2) was measured.

Viscosity (1): the viscosity was measured without shaking the container.

Viscosity (2): the viscosity was measured after the container was shaken strongly for 15 seconds (30 times) at a speed of twice/second and then allowed to stand for 30 minutes.

Furthermore, an average particle diameter (nm) in accordance with the BET method and an average particle diameter (nm) in accordance with the DLS method were measured for the coating-forming composition for an electrical steel sheet.

Average particle diameter (1): the average particle diameter in accordance with the BET method was measured as follows: A cation exchange resin was added to the alkaline silica sol to eliminate sodium ions, and the coating-forming composition for an electrical steel sheet was dried at 110° C. and then ground in a mortar.

The composition was subsequently baked at 300° C., and then the specific surface area was measured with Monosorb from Yuasa Ionics Inc., for example, and the specific surface area was converted to the average particle diameter.

Average particle diameter (2): the average particle diameter in accordance with the DLS method was measured as follows: The coating-forming composition for an electrical steel sheet was diluted with a 0.15% by mass NaCl solution, and the average particle diameter in the solution was measured with a dynamic light scattering particle size measurement apparatus such as the ZETASIZER Nano series from Malvern Instruments Ltd., for example.

Then, (average particle diameter (nm) in accordance with the DLS method)/(average particle diameter (nm) in accordance with the BET method) was determined as the average particle diameter ratio (3).

TABLE 1

| | Number of Days (Day) | | | |
|---|---|---|---|---|
| | 0 | 1 | 2 | 3 |
| Viscosity (1) (mPa · s) | 13 | 15 | 18 | 18 |
| Viscosity (2) (mPa · s) | 13 | 13 | 18 | 18 |
| Average Particle Diameter (2) (nm) | 37 | 50 | | |
| Average Particle Diameter Ratio (3) | 2 | 2 | | |

Example 2

A coating-forming composition for an electrical steel sheet was prepared as in Example 1, except that the silica sol containing 2.65% by mass of phenylphosphonic acid based on the total mass of SiO$_2$ was replaced with a silica sol containing 1.77% by mass of phenylphosphonic acid based on the total mass of SiO$_2$, and the composition was evaluated in the same manner.

TABLE 2

| | Number of Days (Day) | | | |
|---|---|---|---|---|
| | 0 | 1 | 2 | 3 |
| Viscosity (1) (mPa · s) | 15 | 15 | 18 | 25 |
| Viscosity (2) (mPa · s) | 15 | 15 | 18 | 25 |
| Average Particle Diameter (2) (nm) | 37 | 57 | | |
| Average Particle Diameter Ratio (3) | 2 | 3 | | |

Example 3

A coating-forming composition for an electrical steel sheet was prepared as in Example 1, except that the silica sol containing 2.65% by mass of phenylphosphonic acid based on the total mass of SiO$_2$ was replaced with a silica sol containing 0.88% by mass of phenylphosphonic acid based on the total mass of SiO$_2$, and the composition was evaluated in the same manner.

TABLE 3

| | Number of Days (Day) | | | |
|---|---|---|---|---|
| | 0 | 1 | 2 | 3 |
| Viscosity (1) (mPa · s) | 14 | 18 | 45 | 1125 |
| Viscosity (2) (mPa · s) | 14 | 13 | 27 | 38 |
| Average Particle Diameter (2) (nm) | 38 | 105 | | |
| Average Particle Diameter Ratio (3) | 2 | 5 | | |

Example 4

A coating-forming composition for an electrical steel sheet was prepared as in Example 1, except that the silica sol containing 2.65% by mass of phenylphosphonic acid based on the total mass of SiO$_2$ was replaced with a silica sol containing 0.30% by mass of phenylphosphonic acid based on the total mass of SiO$_2$, and the composition was evaluated in the same manner.

TABLE 4

| | Number of Days (Day) | | | |
|---|---|---|---|---|
| | 0 | 1 | 2 | 3 |
| Viscosity (1) (mPa · s) | 13 | 23 | 610 | 1625 |
| Viscosity (2) (mPa · s) | 13 | 13 | 45 | 51 |
| Average Particle Diameter (2) (nm) | 39 | 151 | | |
| Average Particle Diameter Ratio (3) | 2 | 7 | | |

Comparative Example 1

A coating-forming composition for an electrical steel sheet was prepared as in Example 1, except that the silica sol containing 2.65% by mass of phenylphosphonic acid based on the total mass of SiO$_2$ was replaced with a silica sol not containing phenylphosphonic acid, and the composition was evaluated in the same manner.

TABLE 5

| | Number of Days (Day) | | | |
|---|---|---|---|---|
| | 0 | 1 | 2 | 3 |
| Viscosity (1) (mPa · s) | 15 | 460 | 4750 | 5000 or more |
| Viscosity (2) (mPa · s) | 15 | 46 | 69 | 73 |
| Average Particle Diameter (2) (nm) | 46 | 247 | | |
| Average Particle Diameter Ratio (3) | 2 | 11 | | |

Comparative Example 2

A coating-forming composition for an electrical steel sheet was prepared as in Example 1, except that the silica sol containing 2.65% by mass of phenylphosphonic acid based on the total mass of SiO$_2$ was replaced with a silica sol containing 0.88% by mass of trade name HL-415 from Nippon Shokubai Co., Ltd. based on the total mass of SiO$_2$, and the composition was evaluated in the same manner.

TABLE 6

| | Number of Days (Day) | | | |
|---|---|---|---|---|
| | 0 | 1 | 2 | 3 |
| Viscosity (1) (mPa · s) | 14 | 155 | 3350 | 3550 |
| Viscosity (2) (mPa · s) | 14 | 37 | 70 | 94 |
| Average Particle Diameter (2) (nm) | 45 | 266 | | |
| Average Particle Diameter Ratio (3) | 2 | 12 | | |

HL-415 is polyacrylic acid shown below:

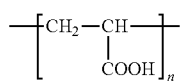

Comparative Example 3

A coating-forming composition for an electrical steel sheet was prepared as in Example 1, except that the silica sol containing 2.65% by mass of phenylphosphonic acid based on the total mass of $SiO_2$ was replaced with a silica sol containing 3.54% by mass of trade name HL-415 from Nippon Shokubai Co., Ltd. based on the total mass of $SiO_2$, and the composition was evaluated in the same manner.

TABLE 7

| | Number of Days (Day) | | | |
|---|---|---|---|---|
| | 0 | 1 | 2 | 3 |
| Viscosity (1) (mPa · s) | 128 | 635 | 2900 | 2400 |
| Viscosity (2) (mPa · s) | 128 | 175 | 103 | 103 |

Comparative Example 4

A coating-forming composition for an electrical steel sheet was prepared as in Example 1, except that the silica sol containing 2.65% by mass of phenylphosphonic acid based on the total mass of $SiO_2$ was replaced with a silica sol containing 0.88% by mass of trade name Dequest 2010 from Italmatch Japan Ltd. based on the total mass of $SiO_2$, and the composition was evaluated in the same manner.

TABLE 8

| | Number of Days (Day) | | | |
|---|---|---|---|---|
| | 0 | 1 | 2 | 3 |
| Viscosity (1) (mPa · s) | 14 | 245 | 3000 | 3600 |
| Viscosity (2) (mPa · s) | 14 | 100 | 105 | 115 |
| Average Particle Diameter (2) (nm) | 46 | 267 | | |
| Average Particle Diameter Ratio (3) | 2 | 12 | | |

Dequest 2010 is 1-hydroxyethylidene-1,1-diphosphonic acid having the following structure:

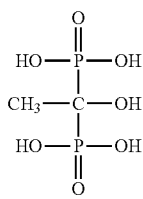

Example 5

The phenylphosphonic acid-containing silica sol and the aqueous solution of aluminium dihydrogen phosphate used in Example 1 were used, and additionally, a zirconia sol (from Nissan Chemical Industries, Ltd.; trade name ZR-40BL; $ZrO_2$ content: 40% by mass; pH 9.4; average particle diameter: 7 nm) adjusted to a $ZrO_2$ content of 30% by mass was used.

123 g of the aqueous solution of aluminium dihydrogen phosphate was placed in a polyethylene container, and 141 g of the phenylphosphonic acid-containing silica sol was gradually added with stirring. After the completion of the addition, stirring was continued for 30 minutes.

Then, 36 g of the zirconia sol was gradually added, and stirring was continued for 30 minutes. The resulting mixture had a pH of 1.77 and an electrical conductivity of 10.6 ms/cm.

The mass ratio of the aqueous solution of aluminium dihydrogen phosphate to the silica sol to the zirconia sol was 41/47/12.

When this was converted to a mass ratio of aluminium dihydrogen phosphate and silica ($SiO_2$) and zirconia ($ZrO_2$), the mass ratio was 20.5/13.9/3.6.

A 100-g portion of this mixture was transferred into each of three containers, which were placed in a thermostat at 22° C., and allowed to stand.

The containers were removed as in Example 1, and the viscosities and the particle diameters were measured.

TABLE 9

| | Number of Days (Day) | | |
|---|---|---|---|
| | 0 | 1 | 2 |
| Viscosity (1) (mPa · s) | 16 | 1400 | 3050 |
| Viscosity (2) (mPa · s) | 16 | 70 | 100 |
| Average Particle Diameter (2) (nm) | 825 | 510 | |
| Average Particle Diameter Ratio (3) | 37 | 23 | |

Example 6

A coating-forming composition for an electrical steel sheet was prepared as in Example 5, except that the silica sol containing 2.65% by mass of phenylphosphonic acid based on the total mass of $SiO_2$ was replaced with a silica sol containing 1.77% by mass of phenylphosphonic acid based on the total mass of $SiO_2$, and the composition was evaluated in the same manner.

TABLE 10

|  | Number of Days (Day) | | |
| --- | --- | --- | --- |
|  | 0 | 1 | 2 |
| Viscosity (1) (mPa · s) | 17 | 1525 | 3100 |
| Viscosity (2) (mPa · s) | 17 | 78 | 115 |
| Average Particle Diameter (2) (nm) | 879 | 573 |  |
| Average Particle Diameter Ratio (3) | 40 | 26 |  |

Example 7

A coating-forming composition for an electrical steel sheet was prepared as in Example 5, except that the silica sol containing 2.65% by mass of phenylphosphonic acid based on the total mass of SiO$_2$ was replaced with a silica sol containing 0.88% by mass of phenylphosphonic acid based on the total mass of SiO$_2$, and the composition was evaluated in the same manner.

TABLE 11

|  | Number of Days (Day) | | |
| --- | --- | --- | --- |
|  | 0 | 1 | 2 |
| Viscosity (1) (mPa · s) | 78 | 1400 | 2850 |
| Viscosity (2) (mPa · s) | 78 | 162 | 175 |
| Average Particle Diameter (2) (nm) | 885 | 839 |  |
| Average Particle Diameter Ratio (3) | 40 | 38 |  |

Example 8

A coating-forming composition for an electrical steel sheet was prepared as in Example 5, except that the silica sol containing 2.65% by mass of phenylphosphonic acid based on the total mass of SiO$_2$ was replaced with a silica sol containing 0.30% by mass of phenylphosphonic acid based on the total mass of SiO$_2$, and the composition was evaluated in the same manner.

TABLE 12

|  | Number of Days (Day) | | |
| --- | --- | --- | --- |
|  | 0 | 1 | 2 |
| Viscosity (1) (mPa · s) | 188 | 1450 | 3150 |
| Viscosity (2) (mPa · s) | 188 | 225 | 235 |
| Average Particle Diameter (2) (nm) | 905 | 860 |  |
| Average Particle Diameter Ratio (3) | 41 | 39 |  |

Comparative Example 5

A coating-forming composition for an electrical steel sheet was prepared as in Example 5, except that the silica sol containing 2.65% by mass of phenylphosphonic acid based on the total mass of SiO$_2$ was replaced with a silica sol not containing phenylphosphonic acid, and the composition was evaluated in the same manner.

TABLE 13

|  | Number of Days (Day) | | |
| --- | --- | --- | --- |
|  | 0 | 1 | 2 |
| Viscosity (1) (mPa · s) | 270 | 2500 | 3500 |
| Viscosity (2) (mPa · s) | 270 | 288 | 275 |

TABLE 13-continued

|  | Number of Days (Day) | | |
| --- | --- | --- | --- |
|  | 0 | 1 | 2 |
| Average Particle Diameter (2) (nm) | 946 | 1187 |  |
| Average Particle Diameter Ratio (3) | 43 | 53 |  |

Comparative Example 6

A coating-forming composition for an electrical steel sheet was prepared as in Example 5, except that the silica sol containing 2.65% by mass of phenylphosphonic acid based on the total mass of SiO$_2$ was replaced with a silica sol containing 0.88% by mass of trade name HL-415 from Nippon Shokubai Co., Ltd. based on the total mass of SiO$_2$, and the composition was evaluated in the same manner.

TABLE 14

|  | Number of Days (Day) | | |
| --- | --- | --- | --- |
|  | 0 | 1 | 2 |
| Viscosity (1) (mPa · s) | 260 | 2600 | 2650 |
| Viscosity (2) (mPa · s) | 260 | 250 | 220 |
| Average Particle Diameter (2) (nm) | 892 | 1057 |  |
| Average Particle Diameter Ratio (3) | 40 | 48 |  |

Comparative Example 7

A coating-forming composition for an electrical steel sheet was prepared as in Example 5, except that the silica sol containing 2.65% by mass of phenylphosphonic acid based on the total mass of SiO$_2$ was replaced with a silica sol containing 3.54% by mass of trade name HL-415 from Nippon Shokubai Co., Ltd. based on the total mass of SiO$_2$, and the composition was evaluated in the same manner.

TABLE 15

|  | Number of Days (Day) | | |
| --- | --- | --- | --- |
|  | 0 | 1 | 2 |
| Viscosity (1) (mPa · s) | 250 | 2050 | 2500 |
| Viscosity (2) (mPa · s) | 250 | 250 | 195 |

Comparative Example 8

A coating-forming composition for an electrical steel sheet was prepared as in Example 5, except that the silica sol containing 2.65% by mass of phenylphosphonic acid based on the total mass of SiO$_2$ was replaced with a silica sol containing 0.88% by mass of trade name Dequest 2010 from Italmatch Japan Ltd. based on the total mass of SiO$_2$, and the composition was evaluated in the same manner.

TABLE 16

|  | Number of Days (Day) | | |
| --- | --- | --- | --- |
|  | 0 | 1 | 2 |
| Viscosity (1) (mPa · s) | 280 | 2700 | 3050 |
| Viscosity (2) (mPa · s) | 280 | 270 | 235 |

TABLE 16-continued

|  | Number of Days (Day) | |
| --- | --- | --- |
|  | 0 | 1 | 2 |
| Average Particle Diameter (2) (nm) | 920 | 1082 |
| Average Particle Diameter Ratio (3) | 41 | 49 |

Results:

The results in Examples 1 to 4 and Comparative Examples 1 to 4 described above have shown that in a coating-forming composition for an electrical steel sheet obtained using the silica sol containing phenylphosphonic acid, an increase in viscosity is reduced when the composition contains 0.30 to 2.65% by mass of phenylphosphonic acid based on the total mass of $SiO_2$. Furthermore, the average particle diameter in accordance with the DLS method (average particle diameter (2)) denotes the particle diameter of the composition in the solution. A smaller variation in the ratio (average particle diameter ratio (3)) of the value of the average particle diameter (2) to the value of the average particle diameter in accordance with the BET method (average particle diameter (1)) means that agglomeration is less likely to occur in the composition, which shows that the composition is stable. The variations in the average particle diameter ratio (3) in the coating-forming compositions for electrical steel sheets according to Examples 1 to 4 are clearly smaller than the variations in the average particle diameter ratio (3) in the coating-forming compositions for electrical steel sheets according to Comparative Examples 1 to 4. This has also shown that because the coating-forming compositions for electrical steel sheets according to Examples 1 to 4 each contained 0.30 to 2.65% by mass of phenylphosphonic acid based on the total mass of $SiO_2$, these compositions were stable.

Furthermore, from the results of Examples 5 to 8 and Comparative Examples 5 to 8, a similar tendency was also obtained when a metal oxide sol (the zirconia sol, for example) was added to the silica sol containing phenylphosphonic acid.

The silica sol containing phenylphosphonic acid, which forms a stable composition when it is used for a coating-forming composition for an electrical steel sheet, exhibits excellent stability as a general coating composition.

The coating-forming compositions for electrical steel sheets each obtained using the silica sol not containing phenylphosphonic acid can be said to be compositions that exhibit thixotropic properties, because they show a decrease in viscosity when shaking is applied. The coating-forming compositions for electrical steel sheets of the present application do not exhibit thixotropic properties. These properties are believed to be derived from the silica sol containing phenylphosphonic acid.

Furthermore, all the coatings for electrical steel sheets formed by applying the coating-forming compositions for electrical steel sheets according to Examples 1 to 8 to the surfaces of surface-treated silicon steel sheets and baking them exhibited excellent insulating properties, corrosion resistance, adhesion, and the like required in coatings for electrical steel sheets.

The invention claimed is:

1. A coating-forming composition for an electrical steel sheet comprising
colloidal silica, a phosphate, phenylphosphonic acid or a salt thereof, and an aqueous medium.

2. The composition according to claim 1, wherein
the colloidal silica is colloidal silica having an average particle diameter of 1 to 500 nm.

3. The composition according to claim 1, wherein the phosphate is monoaluminum phosphate, monomagnesium phosphate, or monocalcium phosphate.

4. The composition according to claim 1, wherein
an amount of the phosphate is 50 to 700 parts by mass, and an amount of the phenylphosphonic acid or a salt thereof is 0.05 to 10 parts by mass, per 100 parts by mass of the colloidal silica.

5. The composition according to claim 1, further comprising a colloidal metal oxide.

6. The composition according to claim 5, wherein the colloidal metal oxide is colloidal zirconia, colloidal titania, or colloidal ceria having an average particle diameter of 1 to 500 nm.

7. A method for producing the coating-forming composition for an electrical steel sheet according to claim 2, comprising
the step of mixing a silica sol comprising colloidal
silica having an average particle diameter of 1 to 500 nm,
a phosphate, and
phenylphosphonic acid or a salt thereof.

8. A method for producing the coating-forming composition for an electrical steel sheet according to claim 6, comprising
the step of mixing a silica sol comprising colloidal
silica having an average particle diameter of 1 to 500 nm,
a metal oxide sol comprising a colloidal metal oxide having an average particle diameter of 1 to 500 nm, a phosphate, and phenylphosphonic acid or a salt thereof.

9. A method for producing the coating-forming composition for an electrical steel sheet according to claim 2, comprising
the step of mixing a silica sol comprising
phenylphosphonic acid or a salt thereof and colloidal silica having an average particle diameter of 1 to 500 nm, and a phosphate.

10. A method for producing the coating-forming composition for an electrical steel sheet according to claim 6, comprising
the step of mixing a silica sol comprising
phenylphosphonic acid or a salt thereof and colloidal silica having an average particle diameter of 1 to 500 nm, a metal oxide sol comprising a colloidal metal oxide having an average particle diameter of 1 to 500 nm, and a phosphate.

11. A sol in which phenylphosphonic acid or a salt thereof and colloidal silica having an average particle diameter of 1 to 500 nm are dispersed in an aqueous medium,
wherein the phenylphosphonic acid or a salt thereof is contained in an amount of 0.05 to 10% by mass based on a total mass of $SiO_2$ contained in the sol.

12. A method comprising applying the sol according to claim 11 as a coating material.

* * * * *